June 5, 1956 A. N. CROWDER 2,749,212
PROCESS FOR RECOVERING SULFATE ASH FROM THE FURNACE
GASES RESULTING FROM BURNING OF BLACK LIQUOR
Filed Sept. 15, 1950 4 Sheets-Sheet 1

INVENTOR.
ALEXANDER N. CROWDER
BY Stowell & Evans
Attorneys

INVENTOR.
ALEXANDER N. CROWDER

United States Patent Office 2,749,212
Patented June 5, 1956

2,749,212

PROCESS FOR RECOVERING SULFATE ASH FROM THE FURNACE GASES RESULTING FROM BURNING OF BLACK LIQUOR

Alexander N. Crowder, Bound Brook, N. J., assignor to Research Corporation, New York, N. Y., a corporation of New York Application September 15, 1950, Serial No. 185,028

1 Claim. (Cl. 23—48)

This invention relates to a process and apparatus for recovering valuable chemicals from black liquor resulting from the manufacture of draft paper pulp by the so-called "sulfate" process.

In the sulfate process of making paper pulp, wood chips are digested with an aqueous chemical solution containing essentially sodium sulfide, sodium hydroxide and sodium carbonate. The solution dissolves the lignin of the wood leaving the cellulosic fibers in suspension in a solution known as black liquor. After digestion, the black liquor is filtered from the fibers. It contains, in modified form, the bulk of the chemicals originally in the solution used to digest the wood plus the lignin and other substances in minor proportion that are extracted from the wood.

The cost of the chemicals contained in the black liquor makes it uneconomical to discard the black liquor. Accordingly, it is concentrated by evaporation to a degree such that it will burn, and thereafter it is burned in a recovery furnace to yield an ash high in sodium sulfide, and sodium carbonate. Most of the ash is withdrawn from the furnace hearth, dissolved in water, and purified for reuse in the digestion of wood chips. Some of the ash, however, is carried out of the furnace entrained in the gaseous products of combustion.

Since about 100 to 150 pounds of ash per ton of kraft pulp produced escapes with the furnace gases, it becomes desirable in the interest of economy to recover this portion of the ash.

It is a principal object of the invention to provide apparatus and a process for effecting recovery of the ash from the furnace gases in an efficient manner.

Another object is to provide electrical precipitation apparatus for collecting and recovering sulfate ash from the flue gases.

A general object of the invention is to provide a process and apparatus for improving the recovery of weak black liquor from kraft pulp digesters.

Still another object is to conserve expensive chemicals utilized in the sulfate pulp process.

Yet another object is to provide a collection device in which foaming of the black liquor is minimized.

The foregoing and other aims, objects and advantages of the invention are realized in a process for recovering sulfate ash from the furnace gases resulting from the burning of black liquor which includes subjecting a stream of such furnace gases to electrical precipitation conditions in an elongated zone through which the gases flow in a substantially horizontal direction, passing a stream of weak black liquor in parallel concurrent flow to the stream of furnace gases in a zone contiguous and subjacent to the precipitation zone, transferring the precipitated ash from the precipitation zone to the stream of black liquor along parallel paths substantially at right angles to the direction of flow of said streams, and dissolving the ash so transferred in the stream of black liquor.

Typically, the apparatus of the invention includes a casing, vertically extending extended surface collecting electrodes and complementary precipitating electrodes in the casing, conduit means conducting a stream of furnace gases substantially horizontally between said electrodes, the casing having a sump subjacent to the electrodes and positioned to receive precipitated material falling from the electrodes, and liquid inlet and outlet means in the sump positioned to direct a stream of black liquor through the sump in parallel relation to the direction of flow of the gas stream.

The invention will be described in greater detail with reference to the accompanying drawings in which.

Figure 1:
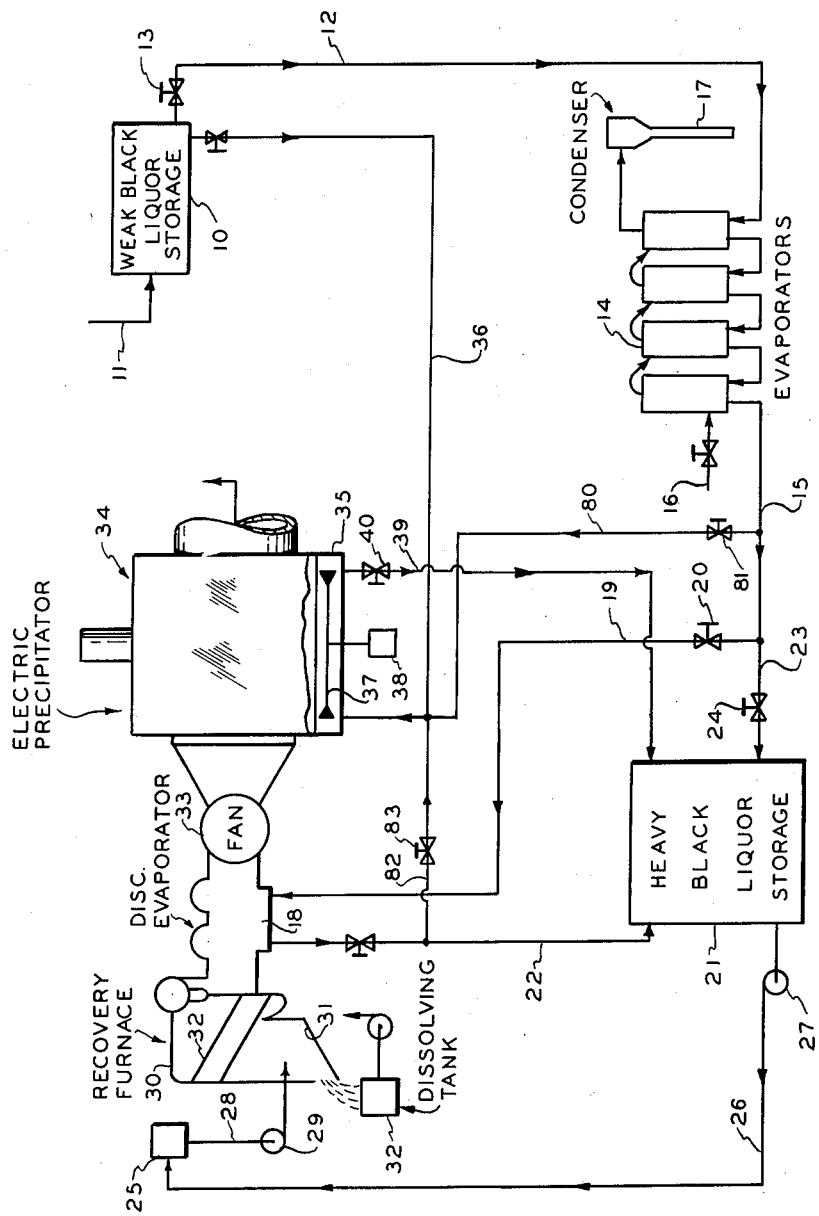
Fig. 1 is a diagrammatic view of a black liquor recovery system in accordance with the invention.

Referring to the drawings, particularly to Fig. 1, the black liquor recovery system diagrammatically shown has a storage tank 10 which is supplied with weak black liquor from the pulp filters and washers through a pipe 11. The weak black liquor contains about 15% solids, of which about 60% is organic material and about 40% is inorganic material.

Weak black liquor is conducted through a pipe 12 controlled by a valve 13 to a multiple effect evaporator 14 from which it issues in a preliminarily concentrated condition to the pipe 15. The multiple effect evaporator is of conventional construction and has a steam inlet pipe 16 at one end and a barometric condenser 17 at the other end.

All or a part of the preliminarily concentrated black liquor in the pipe 15 is conducted to a disc evaporator 18 through the pipe 19 having a flow-control valve 20. In the disc evaporator, the black liquor is concentrated to a further extent by evaporation of water, as will be explained more fully hereinafter. From the disc evaporator, the concentrated black liquor is conveyed to a heavy black liquor storage tank 21 through a pipe 22. Such portion of the black liquor from the multiple effect evaporator as is not subjected to further concentration in the disc evaporator is run directly to the heavy black liquor storage tank 21 through a pipe 23 that has a valve 24.

Evaporating conditions are so controlled that the heavy or strong black liquor in the tank 21 has a concentration of about 58% solids. This heavy black liquor, owing to its content of organic material, is combustible.

The heavy black liquor is impelled to a charging tank 25 through a pipe 26 by a pump 27. From the charging tank, the liquor flows through a line 28 to a furnace charging device 29 by which it is sprayed into a recovery furnace 30.

The recovery furnace is typical of those employed in this field. It has a hearth 31 upon which the concentrated black liquor burns to ash. The sodium sulfate in the black liquor is reduced in the furnace to sodium sulfide that is recovered in the ash together with sodium carbonate and minor portions of other chemicals such as sodium sulfate, sodium thiosulfate and sodium hydroxide. The ash from the furnace hearth is transferred to a dissolving tank 32 in which it is dissolved in water to provide green liquor that is subjected to purification and causticization and reused in the cooking of further batches of wood chips. Any make-up sodium sulfate required in the process may be added to and dissolved in the black liquor charged to the furnace.

Combustion gases from the furnace pass out through heat recovery equipment including a boiler 32.

Flue gases from the furnace flow through the disc evaporator 18 and some of the heat of the gases is used therein to concentrate black liquor from the multiple effect evaporator.

Exhaust gases from the disc evaporator carrying a heavy burden of moisture and suspended sulfate ash are blown by a fan 33 through an electrical precipitator 34 and thence through a stack (not shown) to the atmosphere.

The electrical precipitator 34, to be described in greater detail hereinafter, has a sump 35 in the bottom of the casing. Weak black liquor from the storage tank 10 is introduced into the sump through a pipe 36 adjacent the gas inlet end of the precipitator. A pool of black liquor is maintained in the sump and the pool is mildly stirred by an agitator 37 driven by a motor 38. Black liquor is withdrawn from the sump through a pipe 39 adjacent the gas outlet end of the precipitator. The pipe, under control of a valve 40, delivers the withdrawn black liquor to the heavy black liquor storage tank. Additions to and withdrawals from the sump of black liquor preferably are carried out in a continuous manner so that a continuous flow of black liquor in a direction generally parallel and concurrent to the gas flow is maintained.

In operation, as will appear more fully as the description proceeds, the sulfate ash carried by the flue gases flowing through the precipitator is deposited upon the collecting electrodes from which it is removed by rapping the electrodes. The precipitated ash, which consists essentially of sodium sulfate and sodium carbonate, falls from the electrodes into the sump and dissolves in the stream of black liquor flowing through the sump.

Because the gas flows from left to right through the precipitator, as shown in Fig. 1, the heaviest deposits of ash occur at the gas inlet or left hand end of the precipitator and the relative amounts of ash collected at the gas outlet or right hand end of the precipitator are very low. The major portion of the precipitate is collected in the left hand half of the precipitator. The amount of ash collected is a negative exponential function of the horizontal distance through the precipitator in the direction of gas flow.

With these considerations in mind, it will be understood that relatively large amounts of ash fall into and are dissolved in the weak black liquor entering the sump adjacent the gas inlet end of the precipitator. As the black liquor progresses across the sump from left to right, its concentration of dissolved ash is steadily increased. At the gas outlet end of the precipitator, the fortified or strong black liquor meets the weakest concentration of falling ash.

Weak black liquor containing 15% solids, for example, is fortified in the sump by additions of precipitated ash to a concentration of from 55% to 65% solids at the black liquor outlet end of the sump.

Since, in the range of liquor concentrations encountered in the precipitator sump, the weaker black liquor is better able to dissolve the precipitated ash than the stronger black liquor, it has been found that concurrent flow of gas and liquor is particularly desirable because it introduces the weaker black liquor into the zone of greatest ash fall, thus taking advantage of this solubility characteristic to effect rapid solution of the ash. The black liquor is progressively fortified as it flows concurrently with the gas stream and the lightest fall of ash meets the most concentrated liquor which is able to dissolve the ash without difficulty.

Another reason why concurrent gas and liquor flow is advantageous is because it is desirable to increase the concentration of dissolved ash as rapidly as possible in order to minimize excessive foaming of the liquor. The weaker black liquors have a greater tendency to foam than the stronger black liquors. Foaming is undesirable, since excessive foam may rise to the level of the electrodes and cause an electrical short circuit. Utilizing concurrent flow quickly fortifies the weak black liquor and avoids this difficulty.

Figure 2:
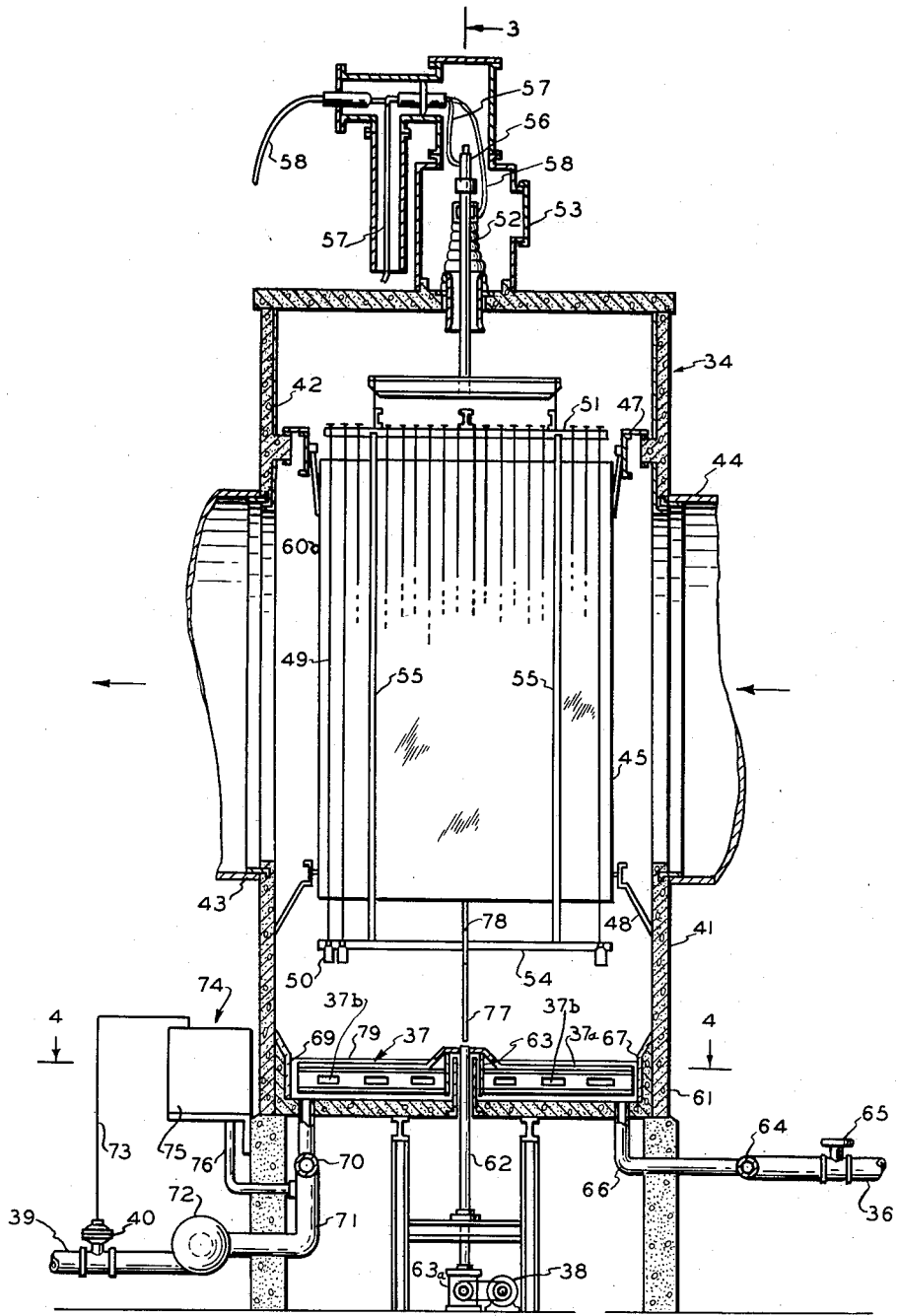
Fig. 2 is a vertical sectional view through the electrical precipitator employed in the system of Fig. 1.
Figure 3:
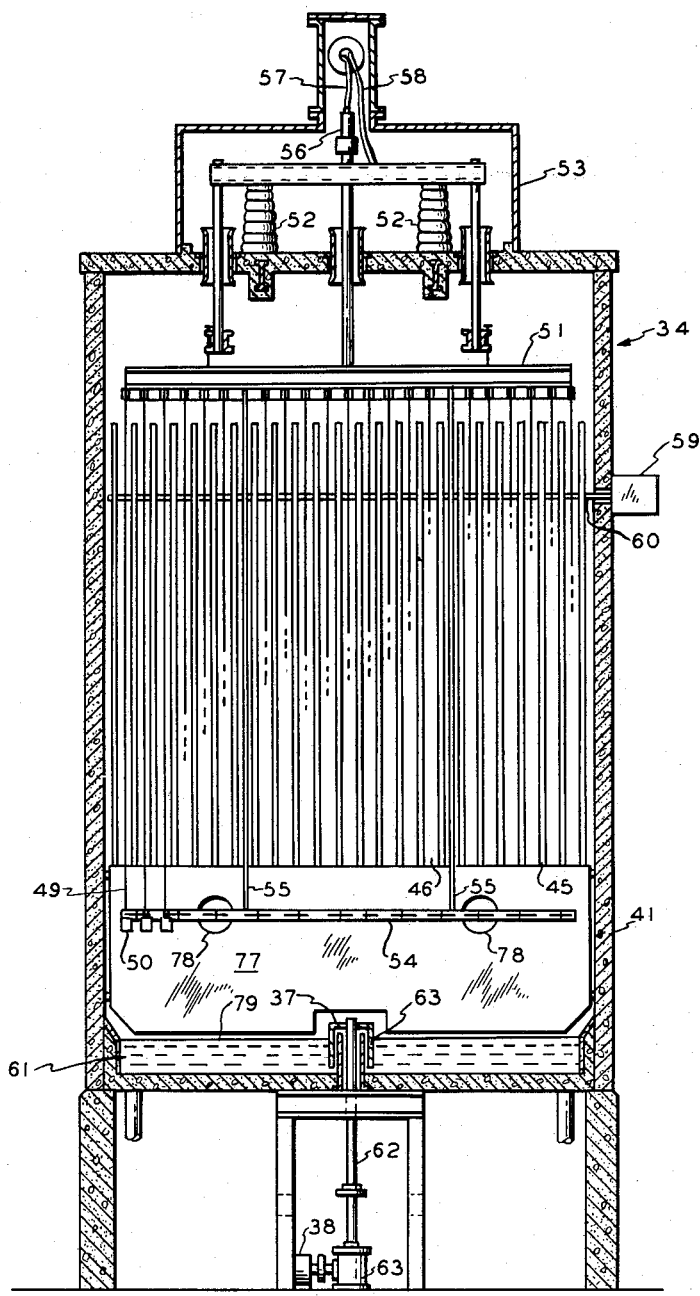
Fig. 3 is a right-hand sectional view taken along the line 3—3 of Fig. 2.
Figure 4:
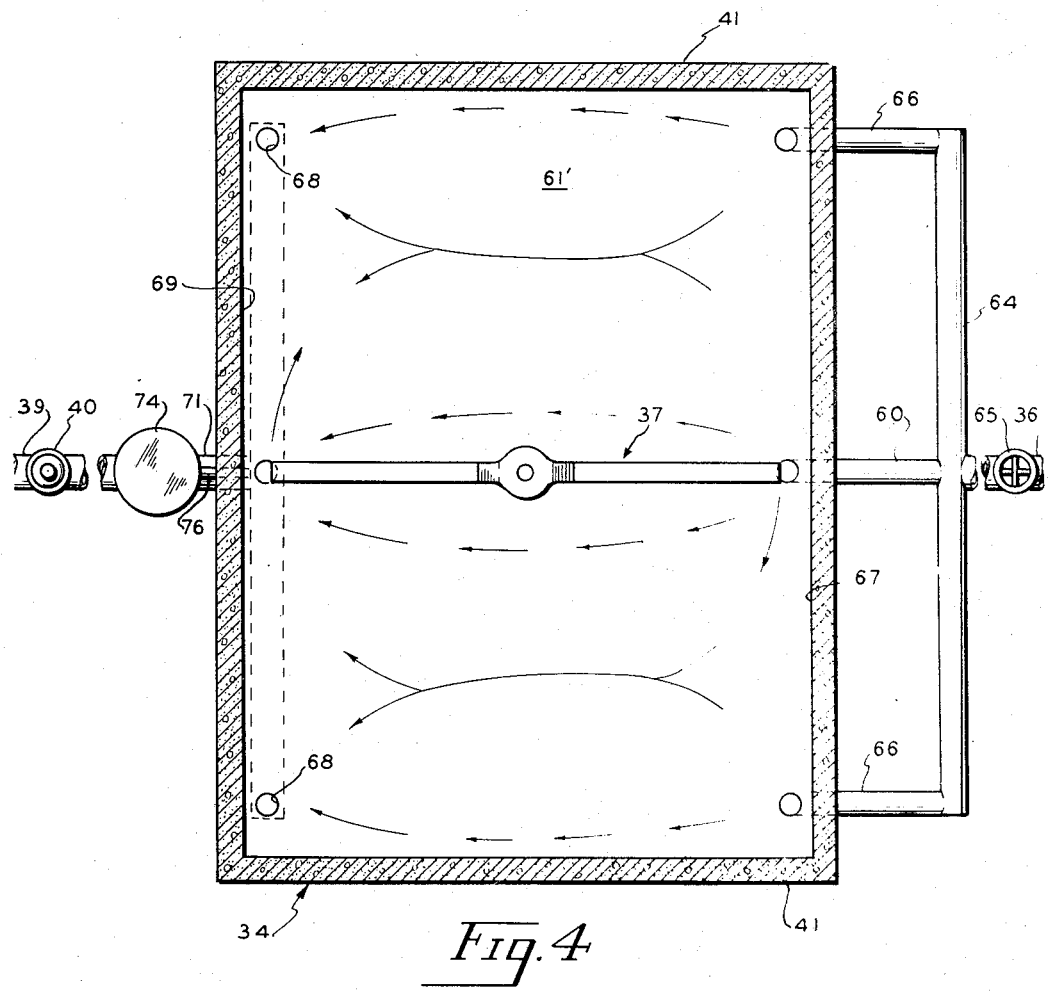
Fig. 4 is a horizontal sectional view taken along the line 4—4 of Fig. 2.

The electrical precipitator 34 is shown in detail in Figs. 2, 3 and 4. It has a shell or housing 41 that may be formed of concrete and lined with ceramic tile 42 that is resistant to corrosion from the recovery furnace gases. Gas outlet means 43, at the left in Fig. 2, and gas inlet means 44, at the right, provide means for directing a stream of recovery furnace gases through the precipitator horizontally from right to left in the direction of the arrows of Fig. 2.

Within the precipitator shell is a plurality of vertically extending collecting electrodes 45 horizontally spaced transversely of the direction of flow of the gas stream to provide a plurality of parallel precipitating conduits 46 through which the furnace gases flow. The collecting electrodes or plates are supported on brackets 47 and 48 carried by the walls of the shell. These brackets also provide transverse gas baffles at the inlet and outlet ends of the precipitator constraining the gas to flow within the conduits 46 and minimizing diversion of the gas stream into the upper and lower portions of the precipitator.

Complementary discharge and precipitating electrodes in the form of fine wires 49 are suspended in curtain formation in the spaces between the plate electrodes. Each discharge wire has a weight 50 attached to its lower end. The upper ends of the discharge wires are attached to a discharge electrode support frame 51 insulatedly supported on ceramic insulators 52 located in the insulator compartment 53. A lower discharge electrode steadying frame 54 is suspended from the support frame 51 by rigid vertical members 55; the steadying frame engages the lower ends of the discharge electrodes and prevents the electrodes from swinging into contact with the plate electrodes.

A pneumatic, or other conventional rapping device 56, supplied with compressed air through an insulating hose 57, is mounted on the discharge electrode support. When actuated, the rapper vibrates the entire discharge electrode system to dislodge any dust that may have become deposited on the discharge electrodes.

High voltage current, preferably unidirectional current, is supplied to the discharge electrode system through the high tension cable 58 that is electrically connected to the discharge electrode support.

The collecting electrodes are grounded through their supporting brackets.

A conventional rapping device is also provided for vibrating the collecting electrodes. This device includes a rapping motor 59 operatively connected to the electrode plates through a link bar 60. When the motor is operated, the plates are shaken and dust that has been precipitated thereon is dislodged therefrom and falls into the lower portion of the precipitator. Other rapping devices may be used. Vibration should be either continuous or intermittent at short intervals. Such operation maintains a steady feed of precipitate to the black liquor in the sump.

The dust-removing function of the precipitator is well understood. In operation, a high electrical potential is impressed across the complementary discharge and collecting electrodes. Corona discharge occurs at the discharge electrodes and a strong unidirectional electric field is set up in the spaces between the complementary electrodes. Gas bearing suspended particles of sulfate ash is caused to flow through the spaces between the complementary electrodes. In these spaces, the gas-borne particles are charged with electricity of the same sign as the charge on the discharge electrodes. The charged particles are then attracted to and deposited upon the oppositely charged collecting electrodes whereon the charge of the particles is dissipated. Periodic or continuous rapping of the electrodes breaks the deposits loose from the electrodes and the collected material falls from the electrodes into the lower part of the precipitator that underlies the electrode.

The bottom of the precipitator shell provides a tile-lined sump 61 that is rectangular in cross-section. A horizontally rotating agitator is carried by a shaft 62 that projects through the bottom of the shell through a liquid sealing device 63. The shaft 62 and the agitator are rotated by the motor 38 through speed reducing gearing 63a.

Weak black liquor from the pipe 36 is admitted to the header 64 through a control valve 65. A plurality of branch pipes 66, for example three in number, conduct weak black liquor from the header into the bottom of the sump and distribute the weak black liquor along the side 67 of the sump that is subjacent to the gas inlet end of the precipitator.

A pool of weak black liquor having a free surface 79 that is slightly above the tops of the agitator arms 37a is allowed to form in and is maintained in the sump. Black liquor is withdrawn from the sump through liquor outlets 68 arranged along the side 69 of the sump that is subjacent to the gas outlet end of the precipitator. The liquor is withdrawn to a header 70 and thence through the pipe 71 to a pump 72 that forces the liquor through a valve 40 to the pipe 39 that conveys the liquor to the heavy black liquor storage tank.

The level of the black liquor pool in the sump of the precipitator is held constant by regulating the efflux of liquor to correspond to the influx.

The valve 40 is regulated through the control line 73 by means of a conventional float-operated control device 74. This device includes a tank 75 connected to the pipe 71 through a liquid conduit 76. The level of liquid in the control tank 75 corresponds to the level of the liquid in the sump and a float in the control tank is set to maintain the liquid at a preselected level in both the tank and the sump by adjusting the setting of valve 40.

The rate at which black liquor flows through the sump is determined by manually adjusting the input valve 65. The output valve 40 is automatically adjusted by the float-operated control device 74 to maintain the pool of black liquor in the sump at a preselected level.

A transverse baffle 77 extends across the precipitator from immediately beneath the collecting plates 45 to a point adjacent the free surface 79 of the black liquor in the sump. This baffle is provided with holes 78 through which certain of the members of the steadying frame 54 project. The baffle aids in restricting the flow of gas to the gas passages 46 between the electrode plates and prevents gas from flowing through the lower portion of the precipitator beneath the collecting plates. The baffle also prevents the heavy dust fall at the gas inlet end of the precipitator from being diverted to the gas outlet end, thereby fortifying the black liquor in the sump to its greatest concentration near the liquid inlet end and thus minimizing foaming in the sump.

Operation of the precipitator is believed to be apparent from the foregoing description. Gases from the recovery furnace, after passing through the disc evaporator are conducted through the precipitator. The electrodes being energized, the sulfate ash carried by the gases is precipitated on the collecting electrodes. The electrodes are rapped, as often as may be necessary, and the collected ash falls into the pool of black liquor in the sump 61. The throughput of black liquor is adjusted by means of the valve 65 to yield a fortified black liquor of the desired concentration at the liquid outlet header 70.

Liquid flow through the sump is generally from right to left, as indicated by the arrows in Fig. 4. The degree of agitation is so gentle that the general direction of liquid flow is not materially interfered with. However, sufficient agitation is provided to break up any large pieces of ash that fall into or accumulate in the sump.

It will be observed that the direction of liquor flow is concurrent to the direction of gas flow in the precipitator. Thus, as explained hereinbefore, the less concentrated liquor dissolves more sulfate ash than the more concentrated liquor, and the liquor is progressively fortified as it flows through the sump.

It will be noted that the agitator 37 is provided with spaced openings 37b which permit the black liquor to flow therethrough. These openings permit a relatively free flow of liquor through the sump in the same direction as the direction of gas flow and reduce the tendency of the agitator to create waves in the black liquor pool whereby objectionable foaming of the liquor would be encouraged.

In the event that the black liquor entering the sump is too weak or that the rate of fortification is too slow because of a low rate of fall of black ash into the sump, in which cases undesirable foaming may occur in the sump, this condition may be corrected by bleeding strong black liquor into the sump at the liquor inlet end to mix with and increase the concentration of the liquor at this point. Suitable sources of strong black liquor for this purpose are the multiple-effect evaporator 14 and the disc evaporator 18. As shown in Fig. 1, the line 80 under control of valve 81 connects with the pipe 15 and is employed to add strong black liquor from the evaporator 14 to the sump. Also, the line 82 under control of valve 83 may be used to convey strong black liquor from the disc evaporator 18 to the precipitator sump.

Although concurrent flow of furnace gases and black liquor in the precipitator has been indicated as the preferred method of operating, it will be understood that certain of the advantages of the invention are achieved with reverse or countercurrent flow of gas and liquor.

From the foregoing description it will be seen that the present invention provides efficient and economical process and apparatus for the recovery of valuable chemicals from black liquor.

I claim:

A process for recovering sulfate ash from the furnace gases resulting from the burning of black liquor which comprises subjecting a stream of such furnace gases to electrical precipitation conditions in an elongated zone through which the gases flow in a substantially horizontal direction, passing a stream of weak black liquor in parallel concurrent flow to the stream of furnace gases in a zone contiguous and subjacent to the precipitation zone, transferring the precipitated ash in a dry state directly from the precipitation zone to the stream of black liquor along parallel paths substantially at right angles to the direction of flow of said streams, dissolving the ash so transferred in the stream of black liquor and maintaining the concentration of the liquor in the dissolving zone above the concentration at which substantial foaming occurs by the admixture with the weak liquor at the inlet to the dissolving zone of black liquor of substantially greater concentration than said weak liquor.

References Cited in the file of this patent

UNITED STATES PATENTS

| Number | Name | Date |
| --- | --- | --- |
| 1,326,414 | Moore et al. | Dec. 30, 1919 |
| 1,931,536 | Goodell | Oct. 24, 1933 |
| 2,196,496 | Hamm | Apr. 9, 1940 |
| 2,213,052 | Rosencrants et al. | Aug. 27, 1940 |
| 2,252,307 | Rosencrants | Aug. 12, 1941 |
| 2,258,467 | Owens | Oct. 7, 1941 |
| 2,392,088 | Hamilton et al. | Jan. 1, 1946 |
| 2,486,877 | Ransburg et al. | Nov. 1, 1949 |
| 2,495,248 | Gagliardi et al. | Jan. 24, 1950 |
| 2,525,325 | Viets | Oct. 10, 1950 |
| 2,588,364 | De Giorgi | Mar. 11, 1952 |
| 2,592,508 | Phyl | Apr. 8, 1952 |
| 2,621,754 | Doyle | Dec. 16, 1952 |